United States Patent [19]

Fisher

[11] 3,733,433

[45] May 15, 1973

[54] IMAGE ANALYSIS

[75] Inventor: Colin Fisher, Hertfordshire, Royston, England

[73] Assignee: Image Analysing Computers Limited, Melburn, Royston, England

[22] Filed: Nov. 19, 1970

[21] Appl. No.: 90,932

[30] Foreign Application Priority Data

Nov. 24, 1969 Great Britain....................57,320/69

[52] U.S. Cl..........178/6.8, 178/DIG. 1, 178/DIG. 36, 356/158, 356/167

[51] Int. Cl.............................................H04n 7/18

[58] Field of Search................178/DIG. 34, DIG. 36, 178/DIG. 1, 6, 6.8, 7.1, 7.2; 356/158, 160, 167, 237, 102, 39; 250/236

[56] References Cited

UNITED STATES PATENTS

| | | | |
|---|---|---|---|
| 3,551,052 | 12/1970 | Reiber | 356/158 X |
| 3,579,249 | 5/1971 | Dewey et al. | 178/DIG. 36 |
| 2,803,406 | 8/1957 | Nuttall | 178/DIG. 36 |
| 2,891,722 | 6/1959 | Nuttall et al. | 178/DIG. 36 |
| 3,244,810 | 4/1966 | Williams | 178/DIG. 36 |
| 3,390,229 | 6/1968 | Williams | 178/DIG. 36 |
| 3,578,904 | 5/1971 | Dewey et al. | 178/DIG. 36 |

*Primary Examiner*—Robert L. Richardson
*Attorney*—Beveridge & De Grandi

[57] ABSTRACT

The invention provides a method of analyzing the features in a field of view in which information arising from features which are truncated by one or more edges of the field of view, is inhibited. Methods and apparatus for performing a chord size distribution on scanned video signal are described together with methods and apparatus for correcting associated parameter information derived from scanned video signal.

Two types of solution are envisaged. According to one solution, all information signals arising during a selected distance within the scanning raster are inhibited. Thus, chord count pulses or associated parameters which appear within a certain time interval from the edges of the scan raster are either not generated or inhibited. According to a second solution, an information signal is only inhibited if, when dealing with line scan intersects of features, the line scan intersect from which the information signal arises begins or ends on an edge of the scan raster or in the case of associated parameters, the feature or area of the image for which the associated parameter is computed touches or intersects one or more edges of the scan raster.

The correction is applied in both line and frame scan directions.

15 Claims, 12 Drawing Figures

IMAGE ANALYSIS

Figure 1:
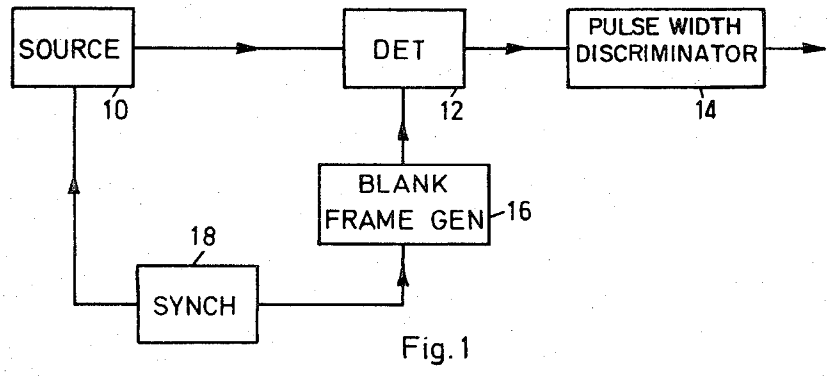

This invention relates to image analysis in which an electrical video signal corresponding to an image is generated and the analysis is performed on the video signal.

Conventional television scanning may be employed with or without interlace but other scanning sources may be employed such as scanning electron microscopes or scanning stage devices. The video signal so produced corresponds to a conventional television signal in which individual line scans are represented by a time varying voltage. Where a line scan intersects a feature (which can be thought of as an island of one grey level on a background of another grey level), the intersect is described as a chord and a selection of desired and undesired image content (which have different grey levels) can be obtained by threshold discrimination or detection as it is more commonly called, by selecting between chords of different grey levels. A detected video signal will thus comprises a series of disconnected electrical pluses the duration of each of which corresponds to the length of the line scan intersect (or chord) of the feature, to which it corresponds.

Subsequent analysis of the detected video signal may be based on a discrimination between the durations of the detected video signal pulses. However, the chords from features which are truncated by the vertical edges of the scan raster will be shortened and, for example, an incorrect chord size distribution will be obtained.

Subsequent analysis may alternatively be based on associated parameters generated from the detected video signal. Thus, an associated parameter may be a single signal generated after scanning of a detected feature to indicate the presence of that feature. Such a parameter is usually termed a count pulse. Another parameter may be a signal generated after scanning of a detected feature has been completed which is indicative of the total area of the detected feature. This may for example be arrived at by assigning an information signal to the end of each chord from a detected feature indicative of the length of the chord and summing the information signals from the chords arising from each feature. Any such parameter is referred to as an associated parameter since it will be associated with one of the features in the field of view. Where a feature is truncated by an edge of the scan raster a simple associated parameter such as a count pulse will not be affected and a correct analysis of the features in the field of view would be obtained but where the associated parameter is dependent on information arising from the whole area of the feature, an incorrect associated parameter will be computed for a feature which is truncated by one or more edges of the scan raster.

It is therefore an object of the present invention to reduce errors in image analysis due to the detected video signal being derived in part from truncated features.

According therefore to one aspect of the present invention a method of analyzing the features in a field of view comprises the steps of scanning the field of view and generating a scanned electrical video signal, generating an information signal after each separate picture element has been scanned and generating a gating signal to inhibit information signals which occur within a selected distance from an edge of the scan raster.

"Separate picture element" is intended to mean the whole of a detected feature or a single line scan intersection of a detected feature. In the first instance it will comprise the series of disconnected electrical pulses arising from the line scan intersections with the feature. In the second case it represents the single electrical pulse arising from any one of the line scan intersections with the feature.

The information signals may be inhibited by actual gating of the signals or the generation of the information signals may itself be inhibited.

Where the separate picture elements are individual line scan intersections with the features and the information signals indicate the lengths of the intersections, it is only necessary to inhibit information signals arising during a selected distance from the leading edge of the scan raster. By leading edge is meant the vertical edge of the scan raster from which each line scan begins. In this event the selected distance from the leading edge of the scan raster is made equal to or just greater than the longest dimension in the line scan direction of any feature in the field of view. This has the effect of reducing the area over which analysis is performed but the result is to prevent information signals from incomplete chord intersects being taken into consideration in the analysis.

Where the separate picture elements are features and the information signals comprise associated parameters for the features, it is necessary to inhibit information signals arising during a selected distance from the leading and trailing edge of the scan raster and the top of the scan raster. By the top of the scan raster is meant the first line scan in the scan raster.

This has the effect of further reducing the area over which analysis is performed but the result is to prevent associated parameters from being taken into consideration in the analysis arising from truncated features. The selected distance from the leading and trailing edge of the scan raster is made equal to or just greater than the longest dimension in the line scan direction of any feature in the field of view and the selected distance from the top of the scan raster is made equal to or just greater than the longest dimension in the frame scan direction of any feature in the field of view.

Conveniently the edges of the scan raster are defined by superimposing a so-called blank frame on the scan raster thereby inhibiting video signal over a small region at the beginning and ending of each scan.

The area of the scan raster from which information signals are allowed, is termed the live frame and any region between a live frame edge and an edge of the scan raster is termed the guard region.

Apparatus for performing the first aspect of the invention may therefore comprise a source of scanned video signal, means for detecting the video signal, computer means for generating an information signal at the end of each line scan intersect of detected video signal and gating means operable to inhibit information signals arising during a selected time interval from the leading edge of the scan raster and after the trailing edge of the scan raster.

Apparatus for performing the invention as applied to the analysis of associated parameters of features in the field of view, may comprise a source of scanned video signal, means for detecting the video signal, computer means for generating an associated parameter from the detected video signal from each feature and gating means operable to inhibit associated parameters arising during selected time intervals at least at the start of each line and frame scan.

It will be appreciated that where the live frame is generated by inhibiting all information signals occurring during selected areas of each scan raster, information signals arising from small features wholly contained within the guard region or regions will be unnecessarily lost.

According therefore to a further aspect of the present invention a method of analyzing features in a field of view comprises the steps of scanning the field of view and generating a scanned electrical video signal, generating an information signal after each separate picture element has been scanned and generating a gating signal to inhibit information signals arising from separate picture elements which intersect an edge of the scan raster.

The information signals may be inhibited by gating the actual information signals or inhibiting the generation of these signals.

To this end a key pulse is generated for each separate picture element if the latter intersects an edge of the scan raster and the key pulse serves as or controls the generation of a gating signal inhibiting the information signal arising from the separate picture element.

Where it is only required to analyze line scan intersects of features only feature intersections with the leading edge of the scan raster need be considered for the purpose of generating the key pulse for the separate picture elements which in this case are line scan intersections.

Where however the current picture elements are the features themselves and it is the associated parameters of the detected features which are to be analyzed, feature intersections with at least the leading edge and top of the scan raster must be considered for the purpose of generating the key pulse for the separate picture elements. Furthermore, it is also preferable to consider feature intersections with the trailing edge of the scan raster (i.e. the locus of the ends of the line scans making up the scan raster) since for certain feature shapes it is possible for the anti-coincidence point (defined hereinafter) for the feature to lie within the live frame whilst parts of the feature intersect the trailing edge of the scan raster.

The determination of an anti-coincidence point for a feature scanned by line scanning is described in U.S. Pat. No. 3,619,494. An anti-coincidence point for a feature is determined by comparing detected video signal pulses in each line scan with detected video signal pulses from the preceding line scan delayed by exactly one line scan period. It is assumed that if the current line scan intersects the feature and it is not the first line scan to intersect that feature, detected video signal arising from the previous line scan intersection with the feature will coincide at least over a small time interval with detected video in the current line arising from intersection of the current line scan with the same feature. A short duration signal is generated by an anti-coincidence circuit after a comparison of video signal in the current line scan with that in the preceding line scan has indicated that there is no coincident detected video signal in the current line scan thereby indicating that the feature has finished. The appearance of this short duration signal marks the anti-coincidence point for the feature.

Apparatus for performing the further aspect of the invention may comprise a source of scanned video signal, means for detecting the video signal, computer means for generating an information signal at the end of each line scan intersect with a feature, means for detecting whether a line scan intersection coincides with the beginning or ending of a scan line and gating means operable in response to the coincidence detection to inhibit the information signal arising from a line scan intersection which begins or ends on an edge of the scan raster. Conveniently the apparatus also includes known means for generating gating signals to thereby generate a blank frame (sometimes referred to as a mask) within the scanning raster of the source of video signal. The coincidence detection can then be simplified since it is only necessary to compare the detected video signal pulses and the pulse defining the blank frame from the blank frame generator.

When the analysis is applied to associated parameters, apparatus for performing the further aspect of the invention may comprise a source of of scanned electrical video signal, means for detecting the video signal, computer means for generating an associated parameter for each detected feature, pulse generator means for generating a key pulse for any detected feature which also intersects an edge of the scan raster and gating means operable by a key pulse to inhibit the output of the computer means for any feature for which there is also a key pulse.

It will be appreciated that the gating means controlling the output of the computer means may in fact be a gate controlling the passage of the output signal from the computer or may be an integral part of the computer which, when activated, inhibits operation of the computer.

It will also be appreciated that the nature of the separate picture elements will be determined by the function of the computer means responsive to the detected video signal from the detector. Thus, in the event that the computer means and associated information processing equipment (with which this invention is not concerned) is arranged to analyze the features on the basis of individual chords arising from line scan intersections with the features, each separate picture element will comprise a single line scan intersection with a feature. However in the event that the computer means takes information from each line scan intersect of a feature, each separate picture element will comprise a complete feature (as defined by the unconnected series of related line scan intersect pulses arising from scanning the feature and detecting the video signal amplitude excursions relating thereto).

It will also be appreciated that where the computer means derives information from other defineable regions of the total image, each separate picture element will correspond to the appropriate defined region within the overall image.

Figure 2:
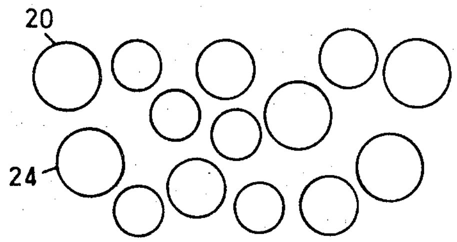
Figure 3:
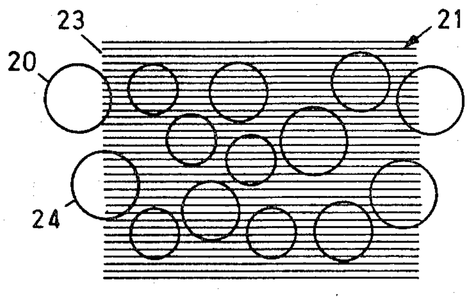
Figure 4:
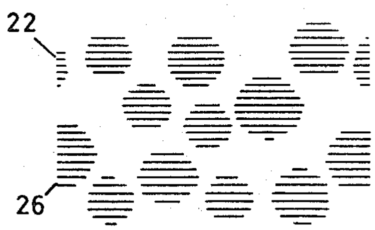
Figure 5:
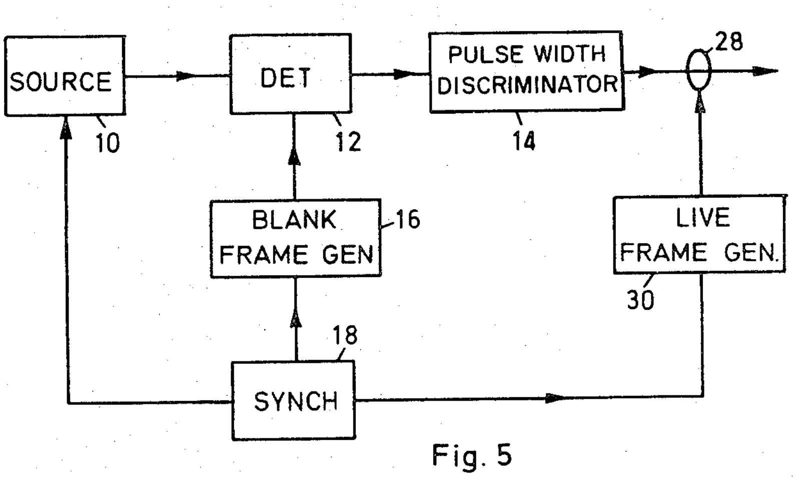
Figure 6:
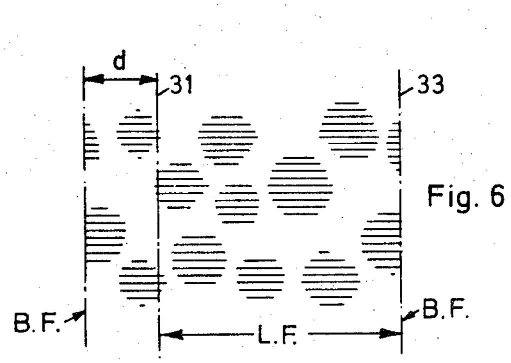
Figure 7A:
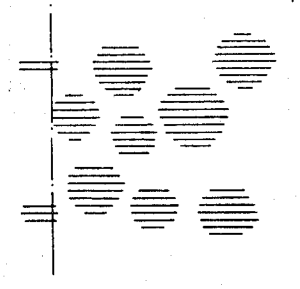
Figure 7:
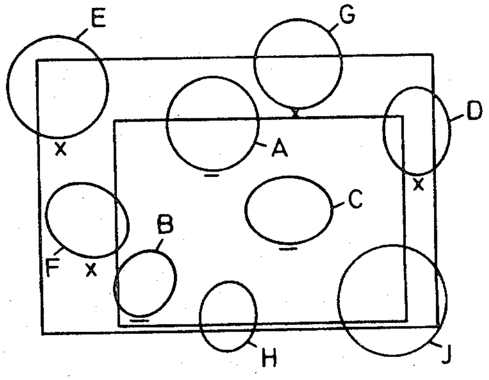
Figure 8:
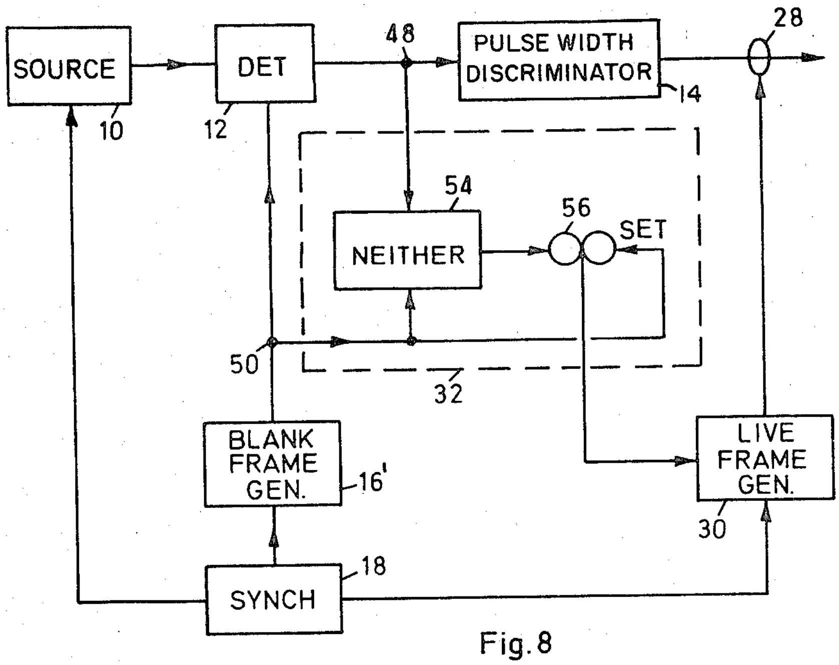
Figure 9:
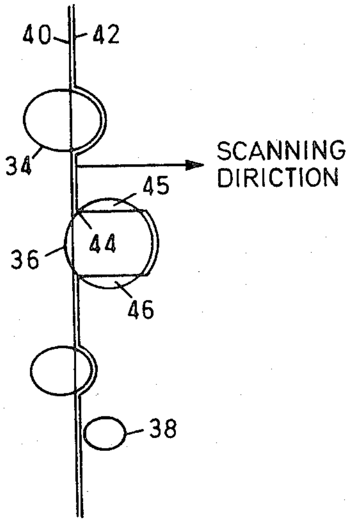
Figure 11:
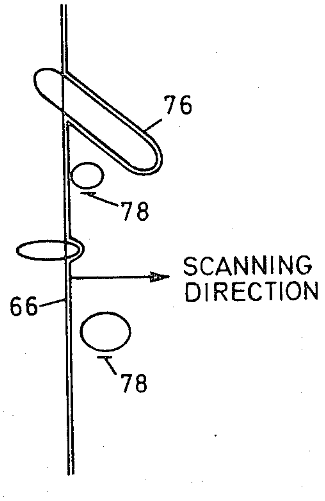
Figure 10:
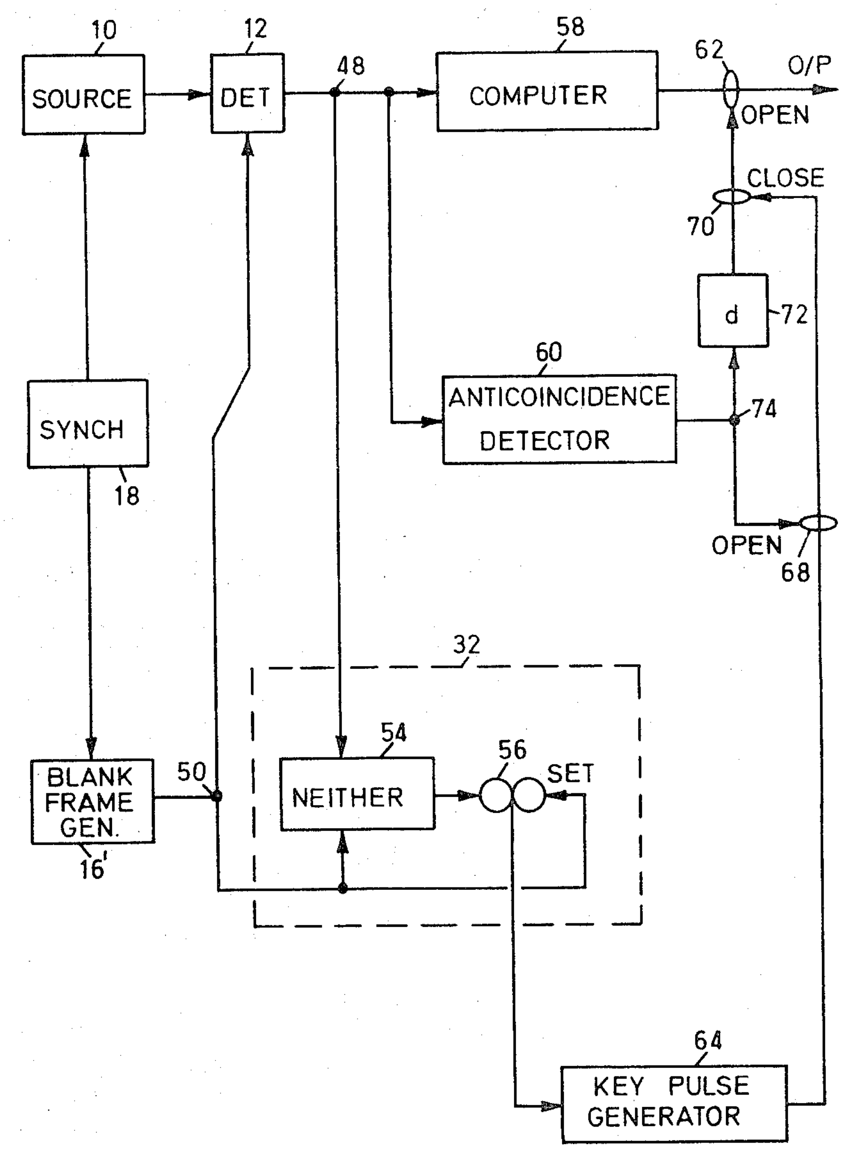

The invention will now be described by way of example with reference to the accompanying drawings in which:

FIG. 1 is a block circuit diagram of part of an image analysis system employing a blank frame facility, FIG. 2 illustrates circular features in a field of view, FIG. 3 illustrates a scanning raster whose edges are defined by a blank frame, superimposed on the features in FIG. 2, FIG. 4 illustrates the actual intersects of the line scans with features which are detected and seen by the computer of FIG. 1, FIG. 5 is a block circuit diagram of part of an image analysis system employing not only a blank frame facility but also a live frame facility in accordance with the invention, FIG. 6 shows the vertical edges of the live frame superimposed on the information supplied to the computer of FIG. 5, FIG. 7 illustrates the actual intersects which are seen by the computer of FIG. 5 and demonstrates how the live frame facility removes from the information supplied to the computer the chords arising from intersections with features lying within the guard region between the blank and live frame edges, FIG. 7*a* illustrates the operation of the system of FIG. 5 when modified to correct associated parameter information signals by means of a live frame facility, FIG. 8 is a block circuit diagram of a modification of the invention as illustrated in FIG. 5, FIG. 9 illustrates the operation of the system shown in FIG. 8 when programmed to disregard all chords which intersect the blank frame edge, FIG. 10 is a block circuit diagram of a further modification of the invention as illustrated in FIG. 5, and FIG. 11 illustrates the operation of the system in FIG. 8 when programmed to disregard the associated parameter of all features which intersect the blank frame edge.

FIG. 1 of the drawings illustrates image analysis apparatus for performing a chord size distribution comprising a source 10 of scanned electrical video signal which is supplied to a threshold detector 12 which for example may be a conventional amplitude discriminator as known to those skilled in the art the output of which serves as the input to a pulse width discriminator 14 which determines the length of each intersect and applies a size criterion thereto and generates a count pulse (= the information signal) if the size criterion is satisfied. The details of such a pulse width discriminator are known to those skilled in the art and an example of such a discriminator is shown in FIG. 1 of U.S. Pat. No. 3,243,509. The output from the pulse width discriminator will therefore correspond to a pulse for each line scan intersection (or chord) greater than or equal to a given length, which has been detected.

In order to remove the unwanted flyback and synchronization information conventionally contained at the end of each line scan from the information supplied to the computer 14, a blank frame is generated by gating pulses from a generator 16. This may be a conventional blank frame generator known to those skilled in the art, an example of which is described in column 3 of U.S. Pat. No. 2,674,915. The gating pulses are supplied to the detector 12 and since the blank frame generator 16 must operate in synchronism with the line and frame scanning, both it and the source 10 are shown connected to a common synchronization and control device 18. If displayed on a television monitor, the pulses defining the blank frame mask will define an area on the monitor screen, typically rectangular, having left hand, right hand, top and bottom edges. Assuming that the scanning beam moves from left to right during each line scan the left hand edge of the blank frame corresponds to the "leading edge" of the frame and assuming that each new frame scan is begun at the top of the screen, the top edge of the blank frame is scanned first and the bottom edge is scanned last.

An image containing circular features such as 20, 24 is shown in FIG. 2. A blank frame line scan raster 21 is shown superimposed on the field in FIG. 3. The feature 20 in the top left hand corner of the image is intersected by the left hand (or leading) edge 23 of the scan raster so that the detector 12 will only transmit electrical information relating to line scan intersections (or chords) to the right of the leading edge 23. These chords are shown at 22 in FIG. 4. Likewise, for feature 24 in the original image, the detector 12 will only pass detected video relating to the chords 26 in FIG. 4. FIG. 4 therefore represents the information on chord lengths which effectively will be supplied to the pulse rate discriminator 14 and it will be appreciated that in respect of features which are intersected by the boundaries of the blank frame, incorrect chord lengths will be seen by the computer which will result in error in the computation of a chord size distribution.

FIG. 5 illustrates an apparatus according to the invention which largely overcomes the problem of errors arising from incomplete chords being supplied to the unit 14. The apparatus is similar to that shown in FIG. 1 with the addition of a gate 28 in the output of unit 14 and a further gating signal generator 30 which will be referred to as a "live frame generator". Since the live frame generator must also operate in synchronism with the line and frame scanning of the source 10, it is also shown connected to the synchronization and control stage 18.

The live frame generator is adjustable to provide gating pulses of selected duration, inhibiting information from the computer at the beginning of each line scan, the time during which information is inhibited being selected to correspond to the time required to scan the maximum dimension (in the direction of line scan) of any of the features in the field of view. This distance is denoted in FIG. 6 by *d*. It will be appreciated that since the information supplied to the pulse rate discriminator 14 is itself not gated, the computer will receive detected video signal information corresponding to all the chords shown in FIG. 6. Since the gate 28 is shut until the line 31 (= the leading edge of the live frame) is reached in each line scan, all count pulses for chords lying wholly to the left of line 31 will be prevented from passing. Likewise, since the generation of each count pulse by the pulse rate discriminator 14 can only occur after a chord has ended, only count pulses which appear in time before the trailing edge of the live frame 33 will be passed through gate 28. Since such count pulses will only arise from chords which have actually ended before the line 33, no count pulses will be transmitted for chords which extend up to the line 33.

The chords for which count pulses will be transmitted by the pulse rate discriminator 14 are shown in FIG. 7 and it will be seen that whereas a proportion of the total field of view has now been lost only count pulses for complete chords will be transmitted. Unless successive frames overlap, it will be seen that it is impossible to count any chord twice and by correct registry of successive frames, little or no information will be lost during the complete step-by-step scanning of a large image.

Although not shown, the apparatus of FIG. 5 may be modified so as to eliminate associated parameter information signals (referring to whole features rather than individual line scan intersections of features) which occur within a guard region within the blank frame.

To this end the chord sizing pulse rate discriminator 14 is replaced by one adapted to compute an associated parameter (such as the area) for each feature, from the line scan intersect information relating to each feature in the detected video signal. Such a computer is described in FIG. 1 of aforementioned U.S. Pat. 3,619,494 to Colin Fisher. Live frame generator 30 is adapted to provide signals to inhibit (by closing gate 28) computed information from the computer arising within a selected distance from each of the edges of the blank frame.

The action of such a modified apparatus is illustrated in FIG. 7*a*. The anticoincidence point at which the associated parameter for each feature is produced by the computer is denoted for features A, B and C by a horizontal bar, since these points lie within the live frame and for features D, E, F and G by an X (indicating inhibition), since these points lie within the guard region. No associated parameter will be passed for features H and J since these intersect the bottom edge of the scan raster and the gate 28 will be shut by the blank frame gating pulse before the anticoincidence point for either of features H or J is detected.

The system shown in FIG. 8 is based on the system of FIG. 5 and is designed to correct chord size information preparatory to performing a chord size distribution and where appropriate the same reference numerals have been used to denote similar stages. Thus the system comprises a source of video signal 10 a detector 12 a blank frame generator 16 a live frame generator 30 and a synchronization stage 18. The live frame generator 30 may for instance be similar to the unit described at column 3, lines 27 to 41, of U.S. Pat. No. 2,674,915. Also as before, the information from the detector 12 is supplied to a pulse rate discriminator 14 which operates as previously described to provide a count pulse at the end of each line scan intersect of detected video. The output from the unit 14 is gated by the gate 28 which as previously described is controlled by the live frame generator 30. However in place of the arbitrary opening and closing of the gate 28 on the basis of selected time intervals from scan raster edges, the operation of the live frame generator 30 in FIG. 8 is modified by a feature sensing circuit generally designated 32. This circuit is arranged to detect when a detected video signal line scan intersect pulse from a feature concides with either the leading or trailing edge of the scan raster and generate a control signal which in turn ensures that the live frame generator does not open the gate 28 until after the detected video signal pulse of that particular line scan intercect has passed. At all other times the live frame generator is arranged to open the gate 28 at the point along each line scan defined by the leading edge of the blank frame.

The operation of the circuit in FIG. 8 can best be understood by reference to FIG. 9 which illustrates a narrow vertical strip of a total field containing a number of features such as 34, 36 and 38. The vertical strip is chosen to coincide with the leading blank frame edge 40 and it will be seen that this edge intersects the features 34 and 36 but is just to the left of feature 38. The correspond live frame edge 42 is also shown in FIG. 9 and as described with reference to FIG. 8, the live frame edge is made to coincide with the blank frame edge 40 except where the latter coincides with line scan intersects of features. At such points, the opening signals for the gate 28 are delayed until after the line scan has passed the trailing edge of the intersected feature so that any information pulse computed from the intersect is inhibited. The live frame edge is denoted by 42 in FIG. 9.

Feature 34 is intersected by the blank frame edge 40. In this feature, all the scan intersects with the feature begin to the left hand side of the intersecting blank frame edge 40 so none are counted. Feature 36 illustrates a special case in which some of the line scan intersects begin to the right hand side of the blank frame edge 40. Accordingly information signals arising from these complete intersections with feature 36 will be passed by the gate 28. Thus since the information signals for chords in region 45 arise from complete intersections with the feature they represent correct information and this is not detrimental to subsequent analysis. However as soon as the blank frame edge 40 intersects the periphery of the feature 36 as shown at point 44, the opening of the gate 28 is delayed until the end of the intersection with the feature 36 thus generating a horizontal locus of the live frame edge 42 at that point. The live frame edge then follows the periphery of the feature 36 until the blank frame edge 40 once again intersects the periphery of the feature 36. Since there are no further intersections of the feature with the blank frame edge 40, the live frame generator 30 resumes its normal operation and opens the gate 28 at the beginning of each line scan corresponding to the boundary of the blank frame edge 40. Thus, information signals arising from chords from the region 46 also, will be passed by the gate 28.

Feature 38 represents another particular case in which the feature is very close to the blank frame edge 40. However the whole of the feature lies to the right hand side of the edge 40 and in consequence the live frame generator will remain unmodified in the region of feature 38 and information signals arising from all the chord intersects with feature 38 will be passed by gate 28.

The feature sensing circuit 32 includes two input junctions 48 and 50 to which are connected the two inputs of a NEITHER gate 54. The output from the NEITHER gate 54 serves as a reset signal for a bistable 56 whose set output serves as a modifying signal for the live frame generator 30. The output from the blank frame generator 16' serves as a set signal for the bistable 56. The two input junctions 48 and 50 are connected respectively to the output of the detector 12 and the output from the blank frame generator 16' so that the bistable is set before and after each line scan. Further it is to be considered that no output arises from the blank frame generator 16' within the blank frame so that the output from the blank frame generator 16' can be considered to change from a signal condition to a no-signal condition as the line scan passes across the leading (or left hand) blank frame edge (40 in FIG. 9). The blank frame generator 16' is the same as blank frame generator 16 with the addition of an appropriate 90° phase shift amplifier (not shown) as would be obvious to one skilled in the art, for inverting the output pulses of generator 16. In the event that no feature is detected on a line scan at the leading (i.e. left hand edge) of the blank frame, the detector output 48 will be zero and at the blank frame edge the output of the blank frame generator 50 also goes to zero, at which point an output appears from the NEITHER gate 54 to reset bistable 56, to open the live frame generator 30 and allow gate 28 to open. This allows any information signals subsequently arising along that line scan to pass. However in the event that a line scan intersect pulse is coincident with the beginning of a line scan determined by the leading (or left hand edge) 40 of the blank frame (see FIG. 9) there will be a signal at the junction 48 (from detector 12) although the output from the blank frame generator 16' goes to zero to denote the beginning of the blank frame on that line. The NEITHER gate 54 will only produce an output at the end of the intersect pulse at junction 48, at which point the bistable 56 is reset, generating the appropriate signal to allow the live frame generator 30 to open the gate 28.

It will be seen that the reverse will obtain at the right hand end of the blank frame, the circuit 32 operating to inhibit the passage of information from the unit 14 beyond the trailing edge of the blank frame (not shown) i.e. the right hand edge of the blank frame.

FIG. 10 illustrates a further embodiment of the invention whose operation is illustrated in FIG. 11. This further embodiment serves to inhibit the passage of an associated parameter for any feature in the field of view which is intersected by a blank frame edge.

The system comprises a source 10 of scanned video signal which is supplied to a detector 12 controlled by a blank frame generator 16', both the source and blank frame generator 16' being in turn controlled by a synchronizing stage 18. As in the embodiment of FIG. 8, the output from the detector 12 and the output from the blank frame generator 16 are supplied to junctions 48 and 50 of a feature sensing circuit 32 comprising a NEITHER gate 54 and a bistable 56 which operate in the same way as described with reference to FIG. 8.

The output from junction 48 is supplied as the input to an associated parameter computer 58 and anti-coincidence detector 60, of the type illustrated and described in FIG. 1 of U.S. Pat. No. 3,619,494 to Colin Fisher which matured from copending application Ser. No. 820,180 the latter serving to deliver a signal to open a gate 62 (equivalent to gate 36 in the aforementioned FIG. 1) in the output of the associated parameter computer 58 at a fixed point in relation to each feature in the field of view immediately after each feature has been scanned. In this way, information relating to each feature and arising e.g. from detected video signal of preceding line scan intersects which has previously been stored in the associated parameter computer 58 and which, after the scanning of each feature is completed, represents a complete parameter for that feature, is released when the gate 62 is opened.

The output from the bistable 56 serves as an input for a key pulse generator 64 which may for instance comprise a second associated parameter computer circuit as illustrated in FIG. 1 of the aforementioned U.S. Pat. No. 3,619,494. If during the scanning of the field of view, any feature is intersected by the edge of the blank frame 66 (in FIG. 11) the bistable 56 will remain SET until the end of the particular intersect pulse as described with reference to FIG. 8 and the SET output signal (referred to as a key pulse) is circulated as a second associated parameter for that feature in the second associated parameter computer memory. The key pulse for any feature is released by the end of feature signal from the anti-coincidence detector 60 which opens a gate 68 (corresponding to gate 62 of computer 58). Note gate 68 corresponds to gate 36 in FIG. 1 of U.S. Pat. No. 3,619,494 for the second associated parameter computer forming the key pulse generator 64.

The key pulse released for a feature is designed to be such as to close a further gate 70 in the path of the end of feature signal from the anti-coincidence detector 60 to the gate 62. Thus in the event that a key pulse is generated for any feature, gate 70 is closed by the key pulse thus preventing the end of feature signal from passing to open gate 62. This in turn inhibits the passage of the associated parameter from the associated parameter computer 58.

In order to ensure that gate 62 is not opened before gate 70 is closed, a small delay 72 is inserted between junction 74 and gate 70 so that the signal from the anti-coincidence detector 60 has sufficient time to open gate 68 and, if present, the key pulse has time to close gate 70 before the "open" signal appears at gate 70 for onward transmission to gate 62.

By comparison with previous embodiments, it will be appreciated that the generator 64, in conjunction with the gates 68 and 70 can be thought of as a live frame generator which generates a second frame whose edges correspond with the blank frame edges except where a feature intersects the blank frame edge. In this latter event, the live frame edge denoted by 76 in FIG. 11 follows the trailing periphery of the intersected feature (i.e. the periphery within the blank frame), and inhibits the passage of the associated parameter for that feature. Information arising from line scan intersects with features which partially lie on the left hand side of the leading (i.e. left hand edge) 66 of the blank frame (see FIG. 11) will be processed by the associated parameter computer 58 but any associated parameter computed therefrom will be inhibited by the gate 62 remaining closed. However information arising from line scan intersects of features lying wholly to the right hand side of the left hand blank frame 66 will be processed by the associated parameter computer 58 and will be passed by virtue of the gate 62 being open.

The same situation will obtain at the trailing (i.e. right hand edge) of the blank frame (not shown), the operation of the circuit 32 serving to inhibit any associated parameter computed from information which has been passed to the associated parameter 58 which arises from line scan intersects with features which intersect the right hand blank frame edge (not shown).

It will be appreciated that although the various embodiments of FIGS. 5, 8 and 10 have illustrated only a single computer 14 or associated parameter computer 58, more than one such device may be included in these embodiments to allow for the simultaneous computation of two or more parameters associated with features of fields of view.

It is to be understood that although the operation of the embodiment of FIG. 10 has been described only in relation to scanning in the line scan direction, a second feature sensing circuit 32 may be provided to determine coincidence of detected video with the upper and/or lower edges of the blank frame and control the opening of gate 62 so as to inhibit the passage of associated parameters arising from features which intersect the upper or lower blank frame edges.

Furthermore it is to be appreciated that the invention is not limited to the provision of a gate 28 or gate 62 in the output of the computer 14 and associated parameter computer 58 respectively. In some circumstances it would be more preferable to inhibit the operation of the computer 14 or associated parameter computer 58 during unwanted line scan intersects. In this event the inhibiting signals described as being applied to close the gate 28 or the gate 70 may be applied to the computer 14 or associated parameter computer 58 respectively.

Furthermore, although the correction as applied by the system of FIG. 10 would apparently remove all incorrect associated parameter information signals, it does introduce a statistical error into the information passed by the gate 62. This arises from the fact that statistically, larger features are more likely to intersect the blank frame edges than small ones. However, this statistical error can be removed by appropriate statistical correction of the information passed by the gate 62.

I claim:

1. A method of analyzing the features in a field of view comprising the steps of scanning the field of view, generating a scanned electrical video signal, generating electrical pulses in synchronism with the scanning to define a blank frame mask having left hand, right hand, top and bottom edges within the scanned field of view, detecting the video signal amplitude excursions which relate to features in the field of view, converting the excursions into constant amplitude pulses, generating an information signal from each separate constant amplitude pulse, generating electrical pulses defining a second mask within the blank frame mask and gating the information signals with the pulses defining the second mask to inhibit information signals not occurring within the second mask.

2. A method as set forth in claim 1 wherein the selected distance from the left hand edge of the blank frame is made equal to or just greater than the longest dimension in the line scan direction of any feature in the field of view.

3. A method as set forth in claim 1 wherein the information signals relate to the duration of their associated constant amplitude pulses and also serve as count pulses.

4. A method as set forth in claim 3 and further comprising the step of applying a size criterion to the information signals before they are counted.

5. A method of analyzing features in a field of view comprising the steps of, scanning the field of view, generating an electrical video signal from the scanning, generating electrical pulses in synchronism with the scanning to define a blank frame mask having left hand, right hand, top and bottom edges within the scanned field of view, detecting the video signal amplitude excursions which relate to features and converting the detected excursions into constant amplitude pulses, generating an information signal unique to each feature from the constant amplitude pulses which are generated from the scanning of the feature, releasing the information signal for each feature after the last constant amplitude duration pulse relating thereto, generating electrical pulses defining a second mask within the blank frame mask, and gating the information signals with the pulses defining the second mask thereby to inhibit information signals not occurring within the second mask.

6. A method as set forth in claim 5 in which the second mask has left hand and top edges spaced from the left hand and top edges of the blank frame mask, the distance between the left hand edge of the blank frame mask and the left hand edge of the second mask being made at least equal to the longest dimension in the line scan direction of any feature in the field of view and the distance between the top edge of the blank frame mask and the top edge of the second mask being at least equal to the longest dimension in the frame scan direction of any feature of the field of view.

7. A method of analyzing features in a field of view comprising the steps of scanning the field of view, generating a scanned electrical video signal, generating electrical pulses in synchronism with the scanning to define a blank frame mask having left hand, right hand, top and bottom edges within the scanned field of view, detecting the video signal amplitude excursions which relate to features in the field of view, converting the excursions into constant amplitude pulses, generating an information signal after each separate constant amplitude pulse, detecting coincidence between a constant amplitude pulse and a signal defining an edge of the blank frame mask, and generating a gating signal to inhibit information signals arising from constant amplitude pulses which are coincident with an electrical signal defining an edge of the blank frame mask.

8. A method as set forth in claim 7 wherein the information signals relate to the duration of their associated constant amplitude pulses and also serve as count pulses.

9. A method as set forth in claim 8 and further comprising the step of applying a size criterion to the information signals before they are counted.

10. A method of analyzing the features in a field of view comprising the steps of, scanning the field of view, generating an electrical video signal from the scanning, generating electrical pulses in synchronism with the scanning to define a blank frame mask having left hand, right hand, top and bottom edges within the scanned field of view, detecting the video signal amplitude excursions which relate to features and converting the detected excursions into constant amplitude pulses, generating an information signal unique to each feature from the constant amplitude pulses which are generated from the scanning of the feature, releasing the information signal for each feature after the last constant amplitude duration pulse relating thereto, detecting coincidence of a constant amplitude pulse and an electrical pulse defining a blank frame mask edge, generating a second information signal for each feature if such coincidence is detected for any constant amplitude pulse relating thereto, and inhibiting the release of a first information signal for a feature if a second information signal is present therefor.

11. Apparatus for analyzing the features in a field of view comprising in combination, means for forming an image of the field, means for scanning the image to generate an electrical video signal, means for generating electrical pulses in synchronism with the scanning to define a blank frame mask having left hand, right hand, top and bottom edges within the scanned field of view, threshold detection means responsive to the video signal for converting detected video signal amplitude excursions into constant amplitude pulses, pulse width measuring means responsive to the output from the detector for generating an information signal proportional to the duration of each pulse at the end thereof, means for generating a second series of electrical pulses in synchronism with the scanning to define a second mask within the blank frame mask, and gating means operable by the pulses defining the second mask to inhibit information signals not occurring within the second mask.

12. Apparatus for analyzing the features in a field of view comprising in combination, means for forming an image of the field, means for scanning the image to generate a video signal relating thereto, means for generating electrical pulses in synchronism with the scanning to define a blank frame mask having left hand, right hand, top and bottom edges within the scanned field of view, means for detecting the video signal amplitude excursions which relate to features and converting the detected excursions into constant amplitude pulses, means responsive thereto to generate an information signal unique to each feature from the constant amplitude pulses relating thereto which are generated from the scanning of the feature, means for detecting the last constant amplitude pulse relating to each feature, means for releasing the information signal for each feature after the last constant amplitude duration pulse relating thereto, means for generating a second series of electrical pulses defining a second mask within the blank frame mask, and gating means operable by said second series of electrical pulses to inhibit the release of information signals not occurring within the second mask.

13. Apparatus for analyzing features in a field of view comprising in combination, means for forming an image of the field, means for scanning the field to produce a video signal relating thereto, means for generating electrical pulses in synchronism with the scanning to define a blank frame mask having left hand, right hand, top and bottom edges within the scanned field of view, threshold detection means for detecting video signal amplitude excursions which relate to features and converting the detected excursions into constant amplitude pulses, means responsive to said threshold detection means for generating an information signal after each separate constant amplitude pulse proportional to the duration thereof, coincidence detection means responsive to the electrical pulses defining the blank frame mask and said constant amplitude pulses from the detector for generating a coincidence signal for the duration of any constant amplitude pulse which is coincident with an electrical signal defining an edge of the blank frame mask, and gating means operable by said coincidence signals and adapted to inhibit the information signals from each constant amplitude pulse for which a coincidence signal is generated.

14. Apparatus for analyzing the features in a field of view comprising in combination, means for forming an image of the field, means for scanning the image to generate an electrical video signal relating thereto, means for generating electrical pulses in synchronism with the scanning to define a blank frame mask having left hand, right hand, top and bottom edges within the scanned field of view, threshold detection means for detecting the video signal amplitude excursions which relate to features and converting the detected excursions into constant amplitude pulses, means responsive to the constant amplitude pulses for generating an information signal unique to each feature from the constant amplitude pulses relating thereto and which are generated from the scanning of the feature, means for detecting the last constant amplitude pulse relating to each feature and for releasing the information signal for the feature after the last constant amplitude duration pulse relating thereto, means for detecting coincidence of a constant amplitude pulse and an electrical signal defining an edge of the blank frame mask and generating a key pulse for said constant amplitude pulse, means for generating a second information signal for a feature for which a key pulse is generated for one of the constant amplitude pulses relating thereto, means for releasing the second information signal for a feature with the first information signal thereto, and gating means operable by said second information signal to inhibit the release of a first information signal for a feature if a second information signal is also present therefor.

15. A method of analyzing the features in a field of view comprising the steps of, scanning the field of view, generating an electrical video signal from the scanning, generating electrical pulses in synchronism with the scanning to define a blank frame mask having left hard, right hand, top and bottom edges within the scanned field of view, detecting the video signal amplitude excursions which relate to features and converting the detected excursions into constant amplitude pulses, generating a first information signal unique to each feature from the constant amplitude pulses which are generated from the scanning of the feature, releasing the first information signal for each feature after the last constant amplitude duration pulse relating thereto, detecting coincidence of a constant amplitude pouse and an electrical pulse defining a blank frame mask edge, generating a second information signal for each feature if such coincidence is detected for any constant amplitude pulse relating thereto, and inhibiting the operation of the means generating the first information signal and the subsequent release of any first information signal in response to a second information signal.

* * * * *